(12) United States Patent
Koning et al.

(10) Patent No.: US 10,936,224 B1
(45) Date of Patent: Mar. 2, 2021

(54) CLUSTER CONTROLLER SELECTION FOR SHARED STORAGE CLUSTERS

(71) Applicant: EMC IP Holding Company LLC, Hopkinton, MA (US)

(72) Inventors: G. Paul Koning, New Boston, NH (US); Himabindu Tummala, South Grafton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 47 days.

(21) Appl. No.: 16/570,963

(22) Filed: Sep. 13, 2019

(51) Int. Cl.
*G06F 12/00* (2006.01)
*G06F 3/06* (2006.01)

(52) U.S. Cl.
CPC .......... *G06F 3/0632* (2013.01); *G06F 3/0604* (2013.01); *G06F 3/067* (2013.01)

(58) Field of Classification Search
CPC ....... G06F 3/0632; G06F 3/067; G06F 3/0604
See application file for complete search history.

(56) References Cited

U.S. PATENT DOCUMENTS

| | | | | |
|---|---|---|---|---|
| 8,874,836 B1* | 10/2014 | Hayes | ................... | G06F 3/0679 711/103 |
| 9,229,774 B1* | 1/2016 | Wilkes | .................. | G06F 9/4818 |
| 2012/0144138 A1* | 6/2012 | Kandasamy | ............ | G06F 9/524 711/163 |
| 2018/0373671 A1* | 12/2018 | Bernat | ..................... | G06F 9/467 |
| 2020/0250092 A1* | 8/2020 | Szeredi | ................. | G06F 16/172 |

* cited by examiner

*Primary Examiner* — Arvind Talukdar
(74) *Attorney, Agent, or Firm* — Amin, Turocy & Watson, LLP

(57) ABSTRACT

Described herein is a system that performs cluster controller selection in a shared storage cluster. A shared storage cluster can include multiple data node devices equipped to access to a shared storage location. The data node devices can be managed by a cluster controller. Furthermore, multiple of the data node devices can be equipped to serve as the cluster controller if necessary. To ensure ongoing operation of a cluster controller, each data node device, including the current cluster controller, can periodically update the shared storage location to indicate the data node device is operational. Each data node device can furthermore perform a cluster controller selection process, and can record its cluster controller selection in the shared storage location. If the current cluster controller fails to periodically update the shared storage location, the cluster controller selection processes at the other data node devices can select a new cluster controller.

20 Claims, 10 Drawing Sheets

CLUSTER CONTROLLER SELECTION FOR SHARED STORAGE CLUSTERS

TECHNICAL FIELD

The subject disclosure relates generally to electronic data storage systems.

BACKGROUND

The large increase in the amount of data generated by digital systems has created a new set of challenges for data storage environments. Traditional storage area network (SAN) and/or network-attached storage (NAS) architectures were not designed to support data storage and protection at large multi-petabyte capacity levels. Object storage technology can be utilized to meet these requirements. By utilizing object storage technology, organizations can not only keep up with rising capacity levels but can also store these new capacity levels at a manageable cost point.

Modern data storage techniques can store data in arrays of data storage devices. As an example, data can be stored in an ECS™ (formerly known as ELASTIC CLOUD STORAGE) system, such as is provided by DELL EMC. Such systems can comprise clusters of data storage nodes. The operation of a cluster can be overseen by a manager. In the event of failure of the manager, or failure of a data storage node, restoration of the failed manager or failed data storage node should be as fast and seamless as possible to minimize disruption.

The above-described background is merely intended to provide a contextual overview of some current issues and is not intended to be exhaustive. Other contextual information may become further apparent upon review of the following detailed description.

DETAILED DESCRIPTION

Figure 1:
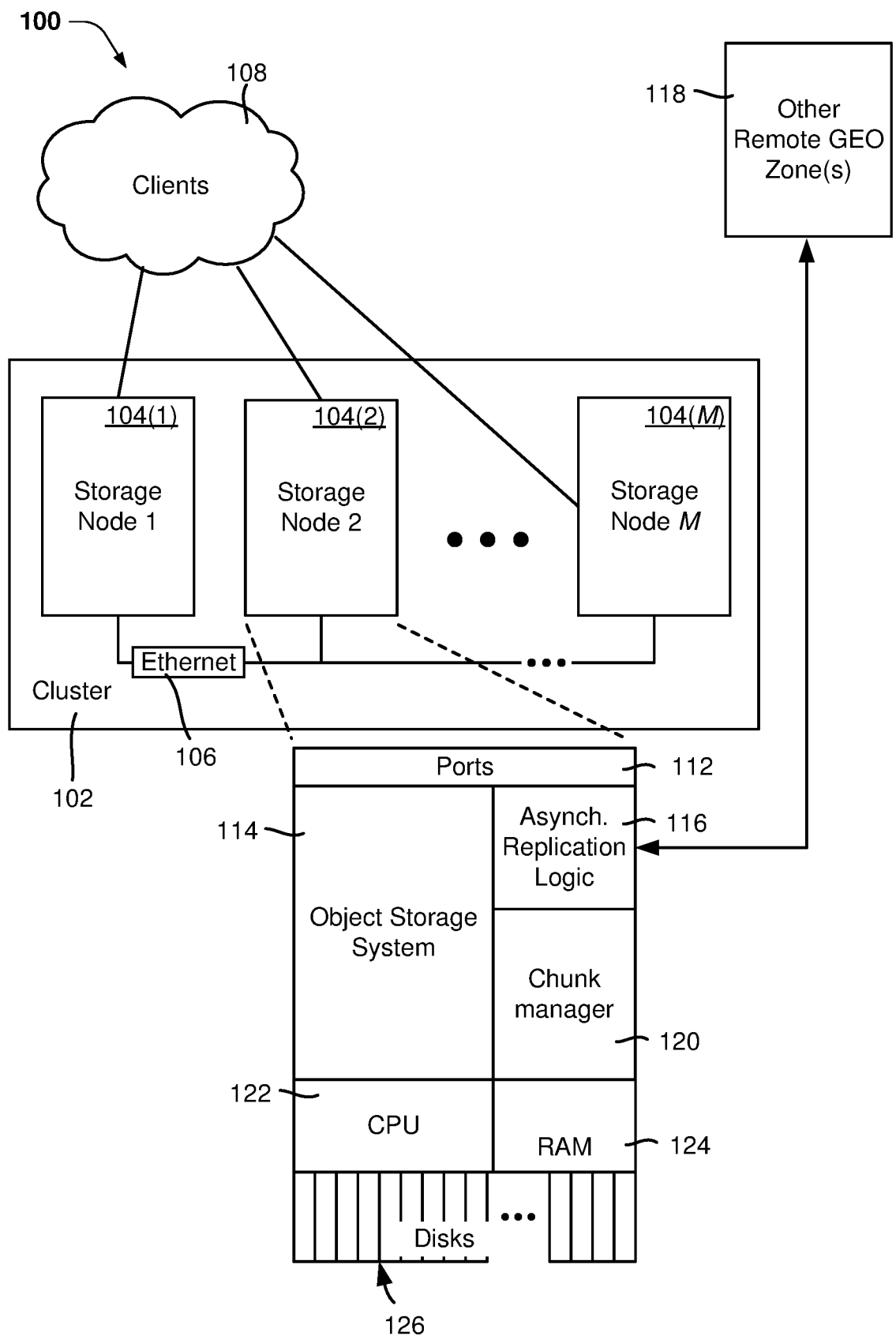
FIG. 1 illustrates an example part of a cloud data storage system, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to cluster controller selection for shared storage clusters. An example shared storage cluster can include multiple data node devices equipped to access to a shared storage location. The data node devices can be managed by a cluster controller. Furthermore, multiple of the data node devices can be equipped to serve as the cluster controller if necessary. To ensure ongoing operation of a cluster controller, each data node device, including the current cluster controller, can periodically update the shared storage location to indicate the data node device is operational. Each data node device can furthermore perform a cluster controller selection process, and can record its cluster controller selection in the shared storage location. If the current cluster controller fails to periodically update the shared storage location, the cluster controller selection processes at the other data node devices can select a new cluster controller.

Example systems and methods disclosed herein, in one or more embodiments, relate to cloud storage systems, such as, but not limited to an ECS™ platform. The ECS™ platform combines the cost advantages of commodity infrastructure with the reliability, availability and serviceability of traditional arrays.

With regard to the ECS™ platform in general, ECS™ can comprise clusters of nodes that deliver scalable public cloud services with the reliability and/or control of a private-cloud infrastructure. Moreover, the ECS™ platform comprises a scale-out, shared-nothing object storage, which employs a microservices architecture pattern. The ECS™ platform can support storage, manipulation, and/or analysis of unstructured data on a massive scale. As an example, ECS™ can support mobile, cloud, big data, content-sharing, and/or social networking applications. ECS™ can be deployed as a turnkey storage appliance or as a software product that can be installed on a set of qualified servers and/or disks.

The ECS™ scale-out and geo-distributed architecture is a cloud platform that can provide the following example features: (i) lower cost than public clouds; (ii) unmatched combination of storage efficiency and data access; (iii) anywhere read/write access with strong consistency that simplifies application development; (iv) no single point of failure to increase availability and performance; and (v) universal accessibility that eliminates storage silos and inefficient extract, transform, load (ETL)/data movement processes; etc.

In an aspect, ECS™ need not rely on a file system for disk capacity management. Instead, ECS™ can partition disk space into a set of blocks of fixed size called chunks (e.g., having a chunk size of 128 MB). User data can be stored in these chunks and the chunks can be shared. Typically, a chunk can comprise fragments of several different user objects. The chunk content can be modified in an append-only mode. When a chunk becomes full, it can be sealed and the content of a sealed chunk is immutable. In a further aspect, a data chunk can comprise a plurality of object segments having a size of 2 megabytes (MB) that are appended in the data chunk. Thus, a data chunk of size 128 MB can have 64 object segments appended together. In general operation, a read request comprises a request to read (e.g., extract) a single object segment.

In another aspect, ECS™ provides a cloud storage system that supports geographically distributed setups comprising two or more zones. Each zone can include a cluster of multiple data node devices which are administered by a cluster controller. The corresponding feature is called GEO. GEO can be used to provide additional protection of user data by means of replication. The replication mechanism can work at the chunks level, although it can also serve object-oriented goals. In an aspect, a chunk with data can be replicated to multiple remote zones. ECS™ can use GEO erasure coding techniques to minimize capacity overhead associated with GEO data protection. Although the systems and methods disclosed herein may be described with respect to object storage systems, the subject specification is not limited to object storage systems and can be utilized for most any storage systems.

The GEO system is capable of employing, e.g., a replication to single site mode, a replication to all sites mode, or a replication to one or more regions mode depending on geographical considerations (e.g., distance and government rules on storing data), site or region storage size considerations (e.g., a site limited to storing 100 million data chunks). A replication to one site mode comprises replicating a backup copy of a data chunk at a single zone. For example, the data chunk is created at a primary zone and a backup is stored at secondary zone. A replication to all sites mode comprises replicating a backup copy of a data chunk at every zone within the GEO system. A replication to one or more regions mode can comprise replicating a data chunk to one or more regions. The data chunk can be replicated at, e.g., a single respective zone of each of multiple respective regions. The advantage of replicating at region level is that it provides greater reliability of accessing the data chunk during zone failure while storing the data chunks at fewer zones, thereby reducing storage resources. In some embodiments, chunks containing data associated with a particular application can be replicated in order to replicate the corresponding objects of the application.

ECS™ supports temporary unavailability of GEO zones. When a zone is temporarily unavailable we say that the zone is in temporary site outage (TSO) mode. Support for TSOs can be accomplished in part through object management. Geographically distributed ECS™ setups maintain a global namespace and assure strong consistency for user data. This is achieved via defining a primary zone for each object. Normally, the primary zone is a zone that created an object. Then, we say that the primary zone owns the object or that the primary zone is the owner of the object. All requests related to the object can be handled by the zone that owns it.

When a zone that owns some object enters TSO mode, a new owner zone can be elected for the object. Note that every available zone of the GEO setup can become the owner. In the general case, a new object owner can facilitate update of the object. This means a potential conflict after the original owner of the object becomes available again. The system runs through a reconciliation phase to resolve conflicts. The ECS's conflict resolution strategy is very simple: choose a latest object update and discard potentially conflicting object updates.

FIG. 1 shows part of a cloud data storage system such as ECS™ comprising a cluster 102 of data node devices, referred to in FIG. 1 as storage nodes 104(1), 104(2) . . . 104(M). Each storage node 104(1), 104(2) . . . 104(M) can comprise a computing device equipped to host multiple virtual machines (not shown in FIG. 1), which may be referred to as network attached storage (NAS) servers. The NAS servers can be configured to serve objects in response to requests from clients 108. Furthermore, typically one of the nodes 104(1), 104(2) . . . 104(M) can host a cluster controller virtual machine (not shown in FIG. 1), making that node the cluster controller node which administers the cluster 102. The nodes 104(1), 104(2) . . . 104(M) can be coupled to each other via a suitable data communications link comprising interfaces and protocols such as, but not limited to, Ethernet block 106.

Clients 108 can send data system-related requests to the cluster 102, which in general can be configured as one large object namespace. There can be on the order of billions of objects maintained in a cluster 102. To this end, a node such as the node 104(2) generally comprises ports 112 by which clients 108 connect to the cloud storage system. Example ports 112 are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), can include an instance of an object storage system 114 and data services. In general, and in one or more implementations, e.g., ECS™, disk space can be partitioned into a set of large blocks of fixed size called chunks and user data can be stored in chunks. Chunks are shared, that is, one chunk can contain segments of multiple user objects; e.g., one chunk can contain mixed segments of some number of (e.g., three) user objects. A chunk manager 120 can be utilized to manage the chunks and their protection.

Each node, such as the node 104(2), can include a CPU 122, RAM 124, and storage devices such as disks 126. RAM 124 and disks 126 can comprise, e.g., volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

For a cluster that comprises a "GEO" zone of a geographically distributed storage system, at least one node, such as the node 104(2), can include or be coupled to reference tracking asynchronous replication logic 116 that synchronizes the cluster 102 with other remote GEO zones, such as 118.

Figure 2:
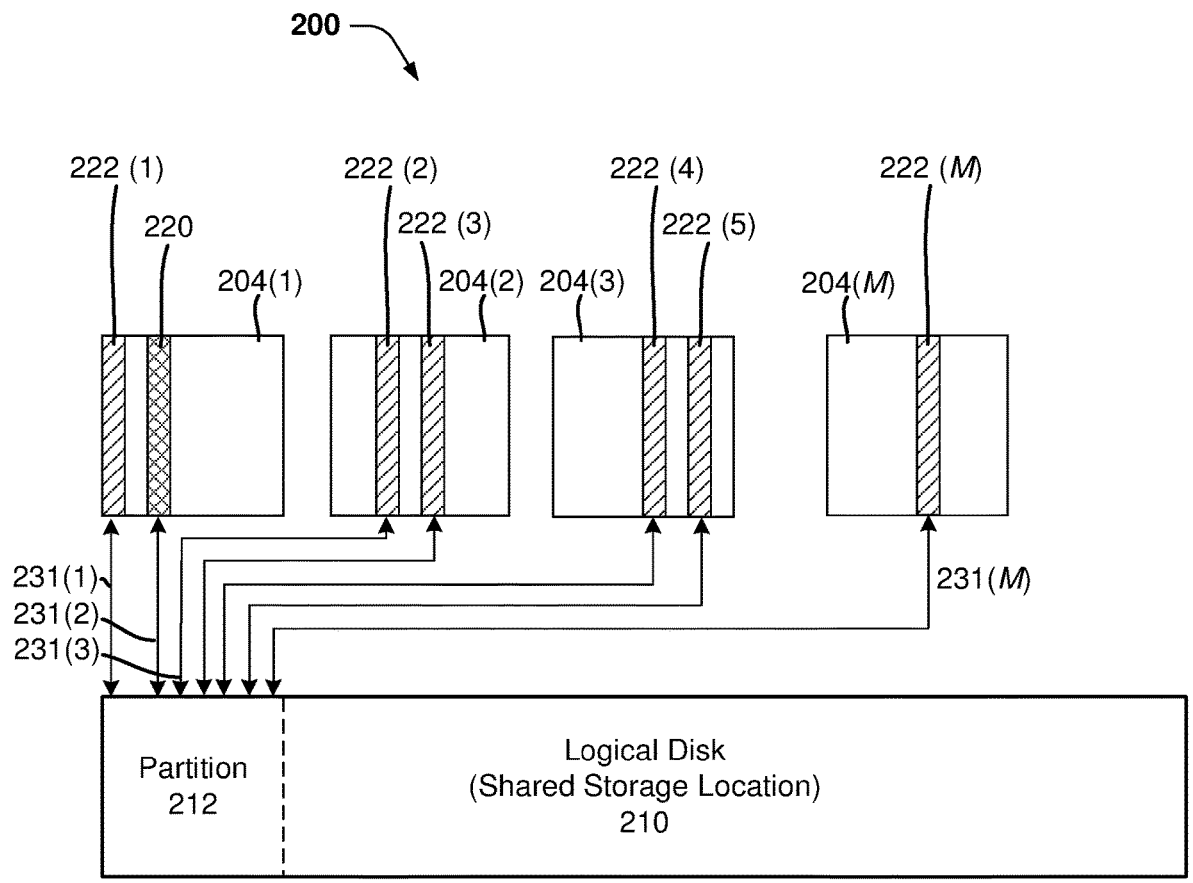
FIG. 2 illustrates an example storage cluster comprising a cluster controller, data node devices, and a shared storage location, in accordance with one or more embodiments described herein.

FIG. 2 illustrates an example storage cluster comprising a cluster controller, data node devices, and a shared storage location, in accordance with one or more embodiments described herein. The example storage cluster 200 includes data node devices 204(1), 204(2), 204(3) . . . 204(M). Each of the illustrated data node devices 204(1), 204(2), 204(3) . . . 204(M) can comprise, e.g., an instance of a storage node such as illustrated in FIG. 1. The data node devices 204(1), 204(2), 204(3) . . . 204(M) can host NAS servers 222(1), 222(2), 222(3), 222(4), 222(5) . . . 222(M). Data node devices can optionally host multiple NAS servers, as shown.

Furthermore, a data node device in the storage cluster 200 can host a cluster controller virtual machine 220. In the illustrated example, data node device 204(1) hosts the cluster controller virtual machine 220, and so data node device 204(1) can also be referred to as a cluster controller device 204(1). The data node devices 204(1), 204(2), 204(3) . . . 204(M) can share a shared storage location such as logical disk 210. The data node devices 204(1), 204(2), 204(3) . . . 204(M) can also perform accesses 231(1), 231(2), 231(3) . . . 231(M) to a partition 212 of the logical disk 210. Accesses 231(1), 231(2) . . . 231(M) can be repeated accesses used to read and write heartbeat information, as described herein, which can be effective to select the data node that hosts the cluster controller, as also described herein.

Figure 3:
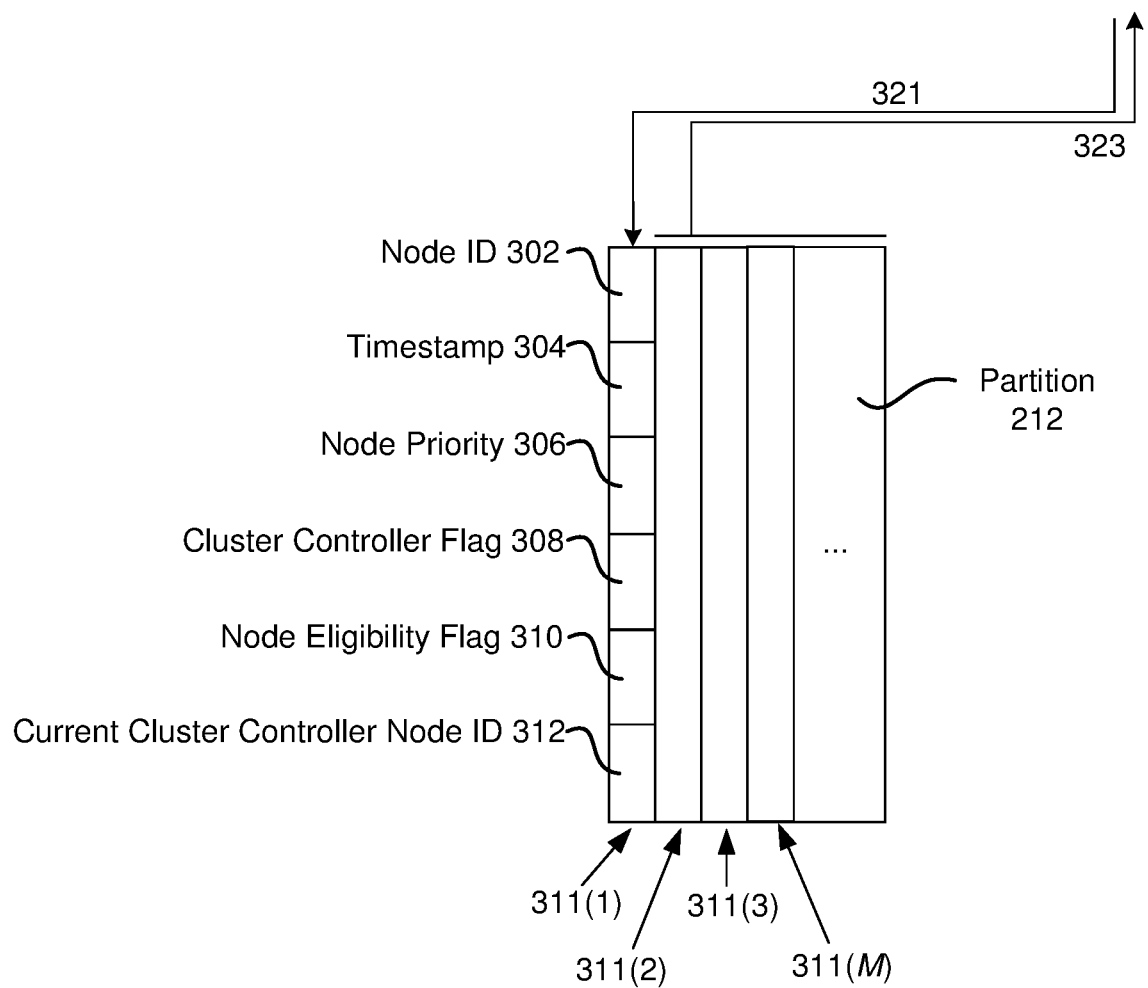
FIG. 3 illustrates an example partition of a shared storage location, and example read and write operations, in accordance with one or more embodiments described herein.

FIG. 3 illustrates an example partition of a shared storage location, and example read and write operations, in accordance with one or more embodiments described herein. The illustrated partition 212 is an example detailed view of partition 212 introduced in FIG. 2. Columns 311(1), 311(2), 311(3) . . . 311(M) represent portions of partition 212 containing data stored by NAS servers, e.g., NAS servers 222(1), 222(2), 222(3), 222(4), 222(5) . . . 222(M), respectively. FIG. 3 includes a detailed view of example heartbeat information stored in column 311(1), where similar heartbeat information may be stored by other NAS servers in other columns 311(2), 311(3) . . . 311(M). The example heartbeat information in column 311(1) includes node ID 302, timestamp 304, node priority 306, cluster controller flag 308, node eligibility flag 310, and current cluster controller node ID 312.

FIG. 3 furthermore comprises an example write operation 321 and an example read operation 323. The example write operation 321 and read operation 323 may be included, e.g., in the accesses 231(1), 231(2), 231(3) . . . 231(M) illustrated in FIG. 2. In write operation 321, a NAS server, e.g., NAS server 222(1) can update the heartbeat information stored in column 311(1). In read operation 311(2), NAS server 222(1) can read the information updated by the other NAS servers 222(2), 222(3), 222(4), 222(5) . . . 222(M), as stored in columns 311(2), 311(3) . . . 311(M), respectively.

Figure 4:
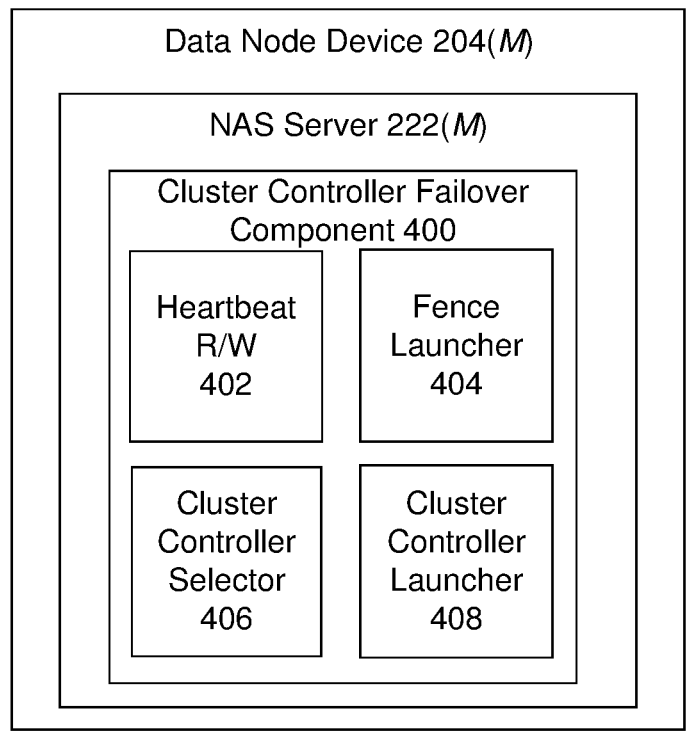
FIG. 4 illustrates an example cluster controller failover component at a data node device, in accordance with one or more embodiments described herein.

FIG. 4 illustrates an example cluster controller failover component at a data node device, in accordance with one or more embodiments described herein. The data node device 204(M) can comprise, e.g., a data node device such as introduced in FIG. 2. As such, the data node device 204(M) can comprise NAS server 222(M). NAS server 222(M) can include, inter alia, a cluster controller failover component 400 equipped to carry out various aspects of this disclosure. In an example embodiment, cluster controller failover component 400 can include a heartbeat read/write block 402, a fence launcher block 404, a cluster controller selector block 406, and a cluster controller launcher block 408.

In normal, non-failover operation, heartbeat read/write block 402 and cluster controller selector block 406 can use the processes disclosed herein to periodically re-affirm a currently selected data node device to host the cluster controller, such as data node device 204(1) in FIG. 2, which hosts cluster controller 220. Heartbeat read/write block 402 can read the heartbeat information recorded by other NAS servers, via a read operation 323 illustrated in FIG. 3. Cluster controller selector block 406 can use the heartbeat information to re-affirm (re-select) a currently selected data node device, e.g., data node device 204(1), to host the cluster controller, e.g., cluster controller 220. Heartbeat read/write block 402 can record, via write operation 321 illustrated in FIG. 3, the node ID of the re-selected data node device 204(1) to host the cluster controller 220. Write operation 321 can record the selected cluster controller node in current cluster controller node ID 312, illustrated in FIG. 3.

In the event of a failure of a cluster controller 220 or a data node device such as 204(1) that hosts the current cluster controller, heartbeat read/write block 402, cluster controller selector block 406, and optionally fence launcher block 404 and cluster controller launcher block 408 can use the processes disclosed herein to identify the failure, fence the failed data node device, and restart a cluster controller at a new data node device.

Figure 5:
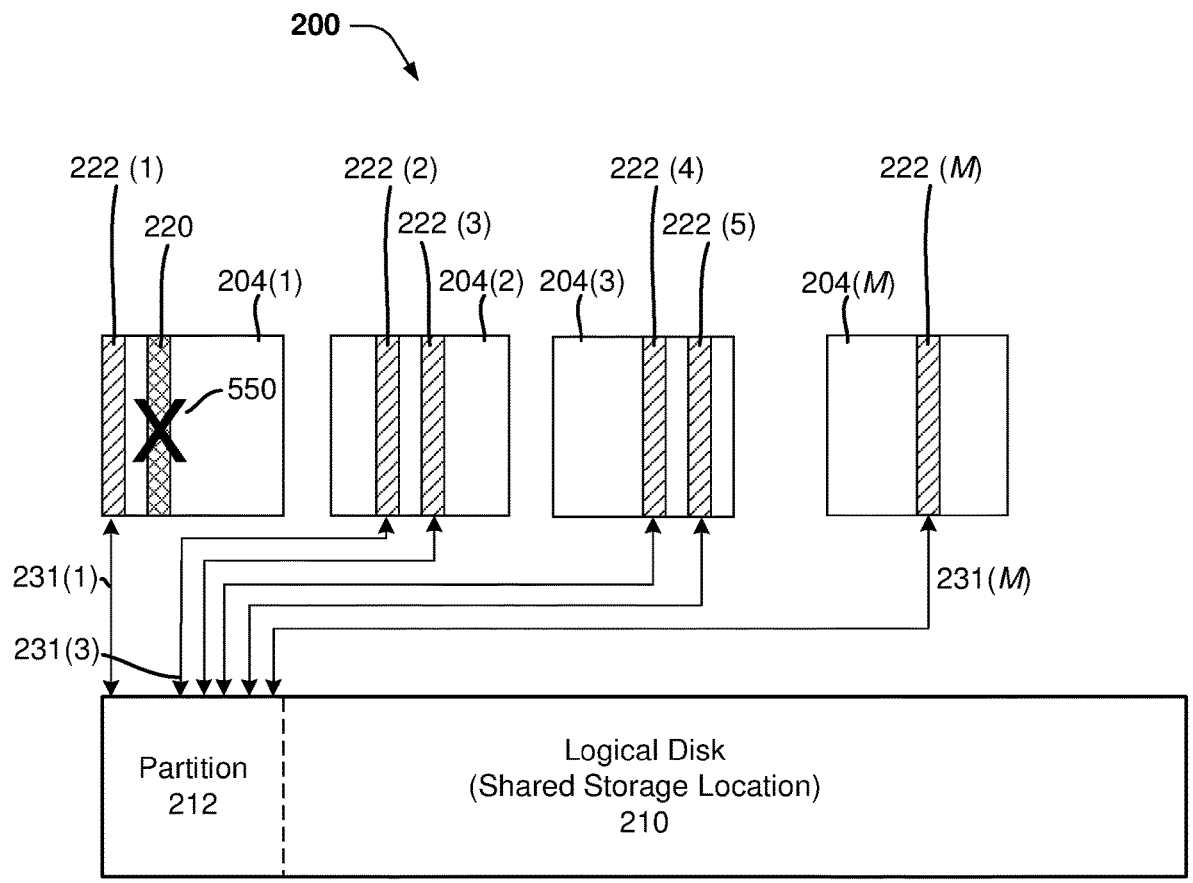
FIG. 5 illustrates the example storage cluster of FIG. 2 after failure of a cluster controller, in accordance with one or more embodiments described herein.

FIG. 5 illustrates the example storage cluster of FIG. 2 after failure of a cluster controller, in accordance with one or more embodiments described herein. The example storage cluster 200 includes many of the elements of FIG. 2, including data node devices 204(1), 204(2), 204(3) . . . 204(M), NAS servers 222(1), 222(2), 222(3), 222(4), 222(5) . . . 222(M), logical disk 210, partition 212, and accesses 231(1), 231(3) and 231(M). However, an X over cluster controller 220 indicates that cluster controller 220 has failed, and as a result, cluster controller 220 is no longer performing accesses 231(2) as illustrated in FIG. 2.

NAS servers 222(1), 222(2), 222(3), 222(4), 222(5) . . . 222(M) can, in subsequent read operations such as 323 illustrated in FIG. 3, identify that cluster controller 220 has failed. A timestamp field 304 recorded by cluster controller 220 will expire, and cluster controller selector blocks such as 406, at NAS servers 222(1), 222(2), 222(3), 222(4), 222(5) . . . 222(M), can responsively select a different node, e.g., 231(M) to host a cluster controller.

Figure 6:
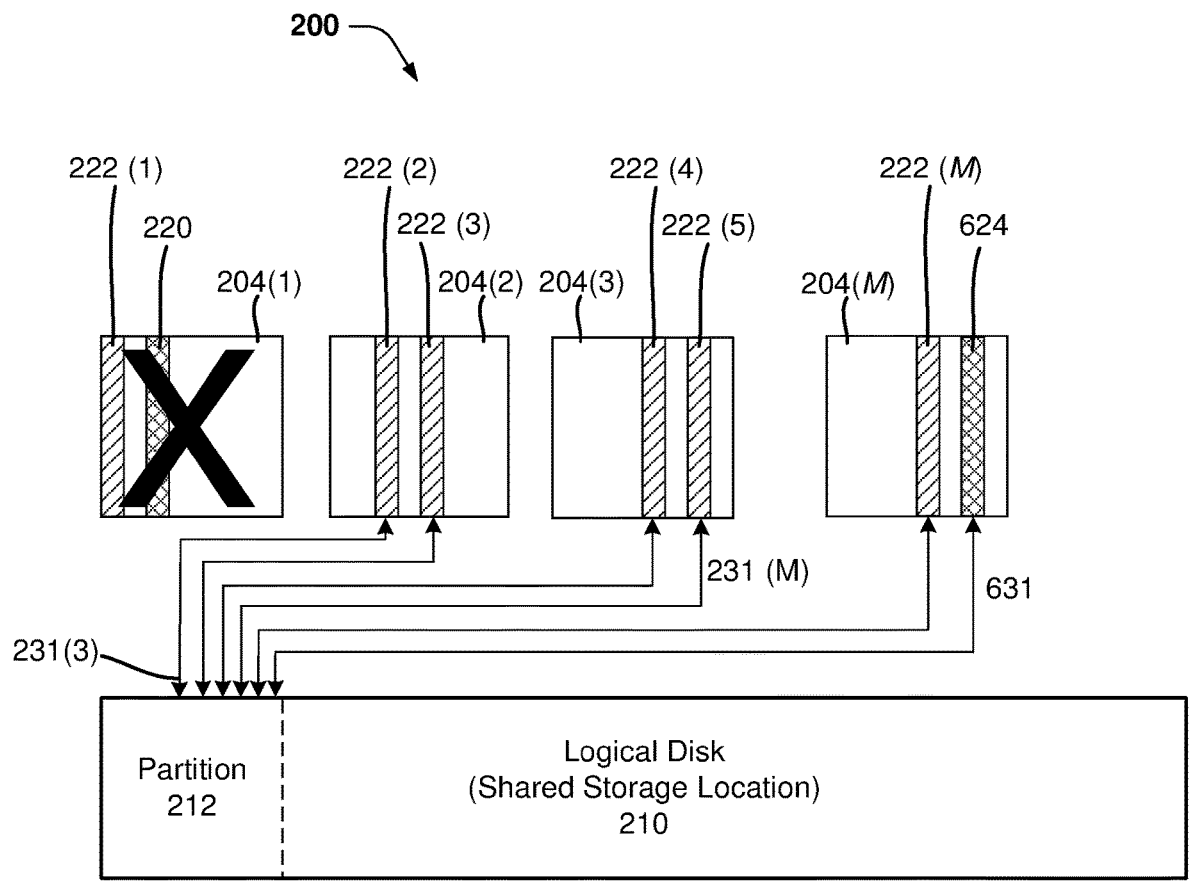
FIG. 6 illustrates the example storage cluster of FIG. 5 after fencing a failed data node device and starting a cluster controller at a newly selected data node device, in accordance with one or more embodiments described herein.

FIG. 6 illustrates the example storage cluster of FIG. 5 after fencing a failed data node device and starting a cluster controller at a newly selected data node device, in accordance with one or more embodiments described herein. The example storage cluster 200 includes many of the elements of FIG. 5, including data node devices 204(1), 204(2), 204(3) . . . 204(M), NAS servers 222(1), 222(2), 222(3), 222(4), 222(5) . . . 222(M), logical disk 210, partition 212, and accesses 231(3) and 231(M). However, an X over data node device 204(1) indicates that data node device 204(1) has been fenced in order to prevent data node device 204(1) from corrupting the shared storage location 210, and as a result, NAS server 221(1) and cluster controller 220 are no longer performing accesses 231(1) and 231(2) as illustrated in FIG. 2. Furthermore, a cluster controller 624 has been started at data node device 204(M). Cluster controller 624 can perform accesses 631 to partition 212, wherein accesses 631 are same as other accesses 231(1), 231(2), 231(3) . . . 231(M) described herein.

In various previous storage cluster arrangements, a single node ("cluster node") contained the cluster controller function, while the remaining nodes provide the NAS data services. Fault tolerance of the cluster controller service was not included. While it was possible to reboot a failed cluster node, or start a new cluster node if a current one fails and cannot be restarted, there was concern about the time required for such recovery. In contrast, embodiments of this disclosure provide an automatic failover mechanism for the cluster controller function, in which the cluster controller can be independent from the data service failover path, so cluster controller failover timing is not critical to data service availability. An operational cluster controller is desired for management visibility, and also to ensure background tasks are performed in a timely manner. For this reason, this disclosure provides a fault tolerant mechanism to deliver the cluster controller service. A target for time for cluster controller interruption in the event of a failure, in some embodiments, can be five minutes or less.

An example detailed embodiment will now be described. The following terminology is applicable to the detailed embodiment.

NASLib—the library for NAS. Can be used for both NAS cluster manager and for a NAS data node.

SDNAS—Software Defined NAS. This includes the entire infrastructure for deploying NAS in a hardware independent environment.

Cluster Node—the node in the cluster currently elected to provide the cluster controller functions.

Cluster Controller—the set of algorithms that perform overall central control of the cluster; these algorithms are intended to run at one place within the cluster rather than being distributed algorithms.

VDM—a unit of execution and state within a node, e.g., a virtual machine.

System VDM—the control component of a node.

Data VDM—a NAS data service component of a node, also referred to herein as a NAS server.

Cluster VDM—the point of execution of the cluster controller function. The cluster VDM is active in the elected cluster node.

Cluster LUN—a block storage logical unit number (LUN) of a logical disk which contains the root file system of the cluster VDM, in which cluster configuration information and persistent state is stored and maintained by the cluster VDM.

Heartbeat—a communication mechanism that allows one or more nodes to confirm that another node is still operational.

Fencing—a mechanism to prevent access to storage or other non-shareable resources by the node that had been judged to have failed, to allow another node to take over safely in its place.

In the example detailed embodiment, new protocols and algorithms can be used to deliver storage cluster fault tolerance. An SDNAS storage cluster, such as storage cluster 200 can have the following example components: one or more nodes, e.g., 204(1), 204(2), 204(3) . . . 204(M), each containing a system VDM started as part of node startup, and zero or more data VDMs. Furthermore, one of the nodes (the cluster node) can contain a cluster VDM. Embodiments can optionally be limited to one type of node, and the cluster controller functionality can be provided by a new VDM type, the cluster VDM, which can run in any node. At any given point in time, the cluster VDM can run in exactly one of the nodes, which may be referred to herein as the cluster node. A selection process, rule or algorithm can select which node can be cluster node.

The cluster controller can keep configuration and cluster state in a file system, e.g., a cluster controller root file system. This can be, e.g., a UFS64 file system, which does not support shared access and so does not support multiple nodes concurrently mounting the file system. For this reason, a function of the cluster node algorithms can be to ensure that at most one node acts as cluster controller at any point in time. In other words, the cluster node arbitrates access to the storage resource. For this reason, the protocols used for cluster controller fault tolerance can be layered on storage mechanisms, not network mechanisms.

The new data structures, algorithms and protocols can include, e.g. the following: First, the cluster LUN, e.g., logical disk 210 can be partitioned into two sections. One section, the partition 212, can be small; it contains some cluster data and a segment for each node. Partition 212 can be used for the storage heartbeat mechanism, so it can be referred to as the "heartbeat partition". The remainder of the LUN in logical disk 210 can provide the file system partition. The heartbeat partition 212 can be accessed by raw block I/O. Up to all nodes 204(1), 204(2), 204(3) . . . 204(M) in the cluster 200 can have read/write access to the LUN in logical disk 210, but only the current cluster node (node 204(1) in FIG. 2) can access a file system partition (not shown in FIG. 2) to mount a file system for the LUN in logical disk 210. In an example, the heartbeat partition 212 can be, e.g., 129 MB in size, including a 1 MB section for cluster information, and a 1 MB section for each of 128 possible nodes in the cluster.

Secondly, the new data structures, algorithms and protocols can include a cluster controller heartbeat protocol, implemented for example by heartbeat read/write block 402, which can operate by having each node write 231 a current timestamp in a timestamp block 304 of the heartbeat partition 212 section for every defined period, e.g., every five seconds. Each node can also read 323 the heartbeat data for every other node, at every heartbeat interval. If no heartbeat is seen (timestamp does not change) for, e.g., an expiration period such as three times the heartbeat interval plus a block storage failover time (e.g., sixty seconds), i.e., for an example expiration period of seventy five seconds, this can taken as an indication that the corresponding node is failed. A fence launcher block 404 can fence off the failed node.

Thirdly, the new data structures, algorithms and protocols can include an election algorithm, implemented for example by cluster controller selector block 406, which can select one of the currently operational nodes of nodes 204(1), 204(2), 204(3) . . . 204(M) to be the cluster node, i.e., the node that runs the cluster VDM. A variety of election algorithms are possible as will be appreciated. Election algorithm can be simple because embodiments need not maintain a network mesh and associated connectivity map.

Fourthly, the new data structures, algorithms and protocols can include algorithms to start and stop the cluster VDM in a node, implemented for example by cluster controller launcher block 406, to allow the cluster VDM to run in a node that also contains data VDMs.

In the example detailed embodiment, the algorithms and protocols can maintain the following invariants: First, each node can obtain the "dynamic set" which is the subset of the configured nodes that can currently do I/O to the cluster controller root LUN. Second, from among the nodes in the dynamic set, exactly one node can be chosen to be the cluster node. Third, the cluster node can run the cluster controller algorithms and provide the cluster IP address. Fourth, once selected as cluster node, a node remains selected until either (a) it is no longer a member of the dynamic set, or (b) a higher priority node appears in the dynamic set. Fifth, the cluster IP address can be highly available, and can be provided by the cluster VDM in the cluster node.

In order to ensure that exclusively-owned resources (such as file systems and IP addresses) are not accessed by multiple nodes, after detecting a failed node, failover processing can begin by fencing. Any node can optionally initiate fencing via a fence launcher block such as 404. Fencing can include, e.g., forcing the failed node to be off.

This ensures data integrity in "split brain" scenarios, for example. While "split brain" should not happen unless there are multiple faults, data integrity should be maintained even in those cases, which also makes the cluster controller multiple fault tolerant.

In some embodiments, fencing can be done by fence launcher block 404 instructing a centralized controller, such as a VMWARE® vCenter controller (or equivalent in SDNAS systems that do not use VMWARE®) to turn off the failed node. On a system employing VMWARE®, that is a "power down" operation of the guest. If a network partition occurs, it can be interpreted as a failure of all the nodes at the other end of the partition. Whichever part of the cluster 200 can still reach the vCenter controller can shut down the other nodes. To avoid errors, in some embodiments, requests can be serialized through a single queue, so that a request to power down a first node made by a second node can be ignored if the second node is currently powered down. In another embodiment, power down requests can be issued with a short delay that can be a function of node index, so that overlapping shut down requests are less likely.

In an embodiment, both the cluster node and the data VDMs can operate on UFS64 type file systems. The cluster VDM file system contains the cluster configuration databases, while a data VDM has a file system for configuration data as well as file systems that it exports to NAS clients. UFS64 can require that one node at a time has a particular file system LUN mounted (whether read/write or read-only). In addition, VDMs can have IP addresses, and when failover activates a VDM at another node, the IP address can be enabled at that node. To avoid duplicate address conditions, the IP address can be disabled at the original node.

For storage fencing, a possible implementation can use small computer system interface (SCSI) persistent reservation to block access to the LUN in logical disk 210 after failover has occurred. Alternatively, to ensure IP address fencing, implementations can use a VMWARE® vCenter controller (or an equivalent in SDNAS implementations that do not use VMWARE®) to turn off a failed node early in the failover sequence. A fencing request (node shutdown) can be issued by each node that identifies a node failure. Since shutdown is idempotent, multiple redundant shutdown requests for a node need not lead to any unwanted side effects. While aspects of this description are in terms of a VMWARE® setup with vCenter to deliver fencing services, it will be appreciated that other approaches are also possible.

In another fencing aspect, after a fencing request has completed, embodiments can disallow storage operations from the targeted (fenced) node to execute on any LUN, until that fenced node is explicitly restarted (re-enabled) by the SDNAS cluster controller. In another fencing aspect, after a fencing request has completed, the targeted (fenced) node can no longer respond to IP addresses of the cluster VDM and of any data VDMs that were previously active at that node.

Further to the node heartbeat mechanism disclosed herein, cluster controller failover can depend on a heartbeat mechanism to detect the failure of a node. This is done by having each node report periodically that it is alive, via a communication channel visible to the other nodes. A new heartbeat can be generated repetitively, and in some embodiments, periodically. A node can be treated as failed if one or more consecutive heartbeats are missed, for example, in an embodiment, a node can be treated as failed if two consecutive heartbeats are missed. However, that does not necessarily mean the node timeout is three times the heartbeat interval, because we have to account for interruptions in the communication mechanism used due to fault tolerance handling there.

Cluster controller failover need not be time critical, but it is preferably tolerant of multiple failures to ensure the cluster remains at least observable for troubleshooting. For this reason, cluster controller failover can be tied to the visibility of the cluster LUN. The first partition 212 of the cluster LUN in logical disk 210 can be used as the data area for a storage based heartbeat. It can be separate from the file system partition, since UFS64 file systems do not support shared access. The heartbeat partition 212 can optionally be accessed directly via raw block I/O, without the use of any file structure.

In an embodiment, the heartbeat partition 212 can comprise, e.g., 1 MB of cluster data, and 1 MB per node of node data. The cluster data can comprise, e.g., a magic value marking a LUN as a cluster LUN. The node heartbeat data for a node can comprise, e.g., a first 4 kilobyte block in a node section entry indexed by the node index, which can be the offset of that node's node ID in the node ID list in the cluster data section. As illustrated in FIG. 3, the node heartbeat data can comprise: (a) Node ID 302; (b) timestamp 304, comprising a node heartbeat timestamp; (c) node priority 306, comprising a node cluster controller priority; (d) cluster controller flag 308, comprising a "node is currently cluster controller" flag; (e) node eligibility flag 310, comprising a "Node is eligible" flag; and (f) current cluster controller node ID 312, comprising a currently elected cluster controller node index.

As for network heartbeat, the heartbeat data can comprise a node ID and a timestamp. Each node can write this into the block it owns in the heartbeat partition 212. Each node can also observe the heartbeat blocks for up to all other nodes. Storage heartbeat operations can start at node startup. The heartbeat write interval can be ten seconds or less in an embodiment, e.g., five seconds, and the assumed worst case block storage interruption time can be, e.g., sixty seconds, which means the heartbeat timeout can be, e.g., seventy five seconds.

At a different, optionally longer, periodic interval, such as every sixty seconds, each node can check whether it has connectivity to the fencing machinery, such as vCenter or an equivalent centralized manager. If not, the node cannot be cluster node, and it can clear the "Node is eligible" flag in its next recorded heartbeat data.

There can be two distinct timeout cases: First, timeout of another node. If no writes are seen in the heartbeat block for another node for the timeout period, also referred to herein as the expiration period, this means that the non-writing node has lost access to the shared storage location 210. In an example implementation, no timeout processing for other nodes need be done for a period of time, e.g., the first seventy five seconds after node startup. In such an embodiment, the startup grace period matches the timeout interval.

A second timeout case is timeout of a heartbeat I/O operation, either the heartbeat write, or the heartbeat reads that check on heartbeats of other nodes. If these heartbeat I/O operations fail to complete within the timeout period, it means a node has lost access to the shared storage location 210.

In both of the above timeout cases, timeout of a node that is currently the cluster controller can trigger cluster controller failover operations by the other nodes in the storage cluster 200.

In example operations of a cluster VDM, the cluster VDM can be active in the node elected to provide the cluster controller function, which we call the cluster node. The cluster VDM delivers the cluster controller functions. The cluster VDM is similar to a system VDM in that it can own one file system—its root file system, which stores the database it manages. The difference from the system VDM is in which databases it manages and which algorithms it executes.

The cluster VDM can be started by the system VDM when the cluster node is elected, and the cluster VDM can be stopped when a different node is elected. There can be a single instance of the root file system for the cluster VDM in an SDNAS cluster. The LUN for this file system (the cluster LUN) is attached to all nodes, but at any given time only one of them runs the cluster VDM so only that node has the file system mounted.

The cluster VDM can also own an IP address, which is interpreted as the address of the SDNAS cluster. Operations and maintenance (O&M) requests can be sent to this address. Requests for other cluster-wide services can also be sent here. Since VDM startup is fast, the disclosed design can start and stop the cluster VDM, rather than having cluster VDM instances running at every node but transitioning them between active and standby states.

With regard to cluster node election, a "dynamic set" which is the set of nodes from which the cluster node is chosen, can be defined as the set that can currently access the cluster controller root file system LUN in logical disk 210, i.e., the set of nodes that is successfully writing and reading heartbeat information in the LUN in logical disk 210.

Substantially immediately after startup, a node can see the heartbeat data of all the other nodes, but it cannot tell which of those nodes are currently alive. The timestamps do not serve for this purpose since embodiments need not require the nodes to have accurately synchronized clocks as a prerequisite for the heartbeat algorithm to work. Once a newly started node sees the timestamp in another node's data change, it knows that node is up. Conversely, if the data does not change for the timeout period, that node is known to be down (timed out). For this reason, a node does not become eligible to be cluster node, and does not participate in election, until after it has been running for the timeout period. This ensures that the election is based on accurate inputs. Prior to this point, the node reports itself as not eligible, and reports a vote of zero—which is a blank ballot that is ignored when determining consensus.

A deterministic process for electing a node to server as cluster node can comprise, for example the following operations:

1) If a node has the "eligible" flag clear in its heartbeat data, it is not a candidate for cluster node
2) The cluster node is the node in the dynamic set with the highest cluster priority.
3) If more than one node has the highest cluster priority:
   (a) If one of these nodes is currently cluster node, it remains cluster node.
   (b) Otherwise, the node with the lowest node index (lowest offset in a cluster node ID table) is cluster node.

If a node should be cluster node but currently is not, there can be two cases: First, the previous cluster node timed out and was dropped from the dynamic set. In this case, the new cluster node can first fence the old cluster node. Second, the previous cluster node is in the dynamic set. This case applies if the previous node is resigning (by clearing its eligible flag), or this node has higher cluster priority than the previous cluster node. In this case, the node can wait for the "node is cluster controller" flag to be cleared in the heartbeat data for the previous cluster controller, indicating that it has completed the shutdown of its cluster VDM.

The conclusion of the election process can be that one node is picked as the one that should be cluster controller, unless none of the nodes are eligible. Using the example algorithm provided herein, every node can select the same cluster node once any data changes have settled. To avoid conflicting outcomes when multiple nodes change election-related parameters at the same time, each node can report its current election outcome in the "currently elected node" field of its heartbeat data. Election has completed when all operational nodes (nodes that have not timed out) that are eligible and that are casting a vote report the same value for currently elected node.

Once the above has been done, the new cluster node can set the "node is cluster controller" flag in its heartbeat data, and after that write has completed, it can activate the cluster VDM.

If a node is currently cluster node but it should not be, e.g., because it sees that some other node should now be cluster node due to having a higher priority, or because it has lost access to the cluster LUN, the node can terminate the cluster VDM, including releasing resources such as its IP address. Upon completion it can clear the "node is cluster controller" flag in its heartbeat data, and then write that to the heartbeat block for this node if it still has access to the cluster LUN. The same applies if a cluster node wants to resign that role; a typical example would be administratively commanded node shutdown.

According to an embodiment, the "cluster priority" can be a node parameter such as a 32 bit unsigned integer which is normally non-zero. The "eligible" flag can be cleared when a node does not want to be cluster node. This can be used in products that want to use distinct nodes for cluster and data nodes. It may also be used as a mechanism to resign as cluster node. For example, this can be done as part of executing a controlled node shutdown. All election changes can be logged, reporting which node is now cluster node, and/or which node is no longer cluster node.

Figure 7:
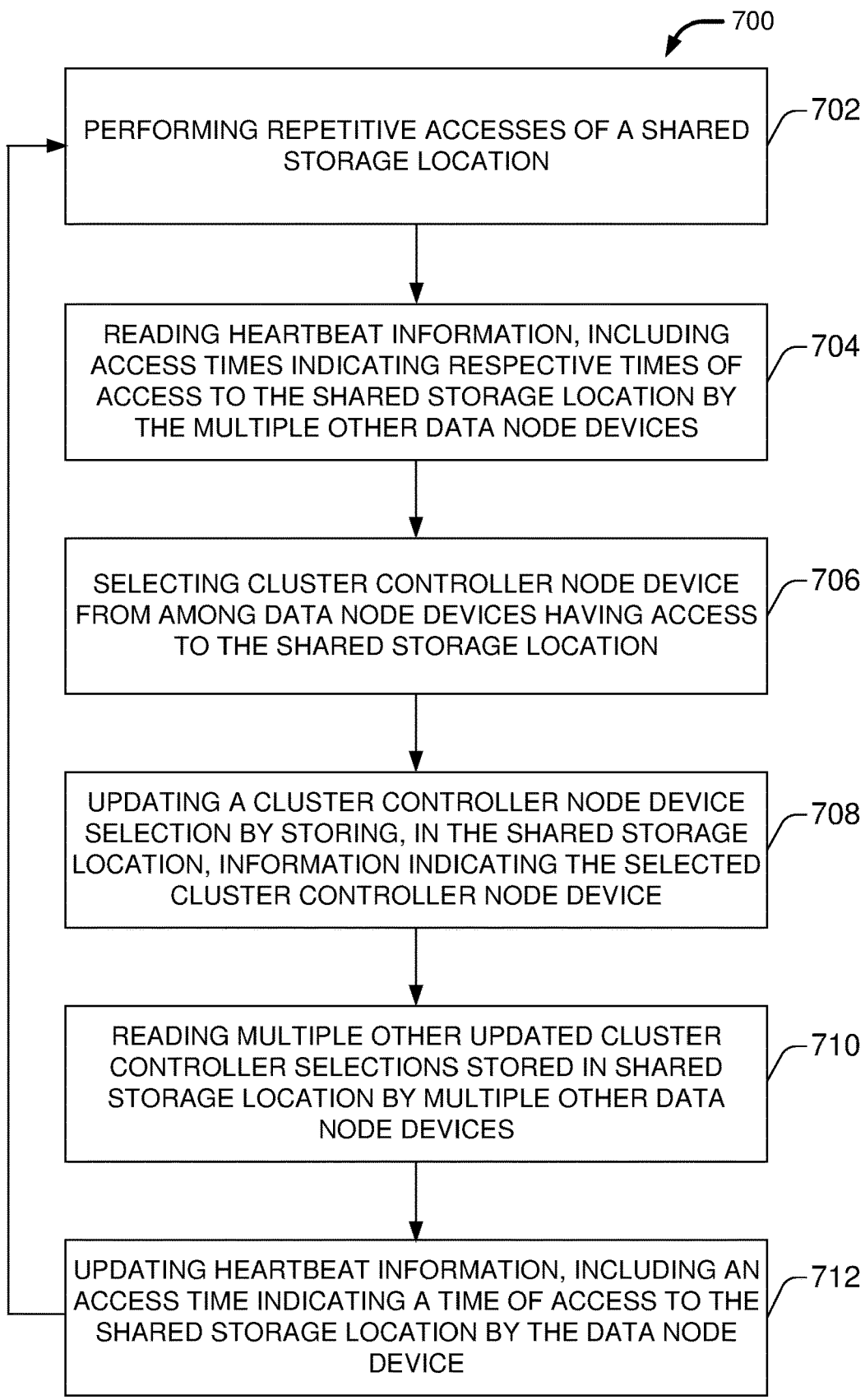
FIG. 7 is a diagram of an example, non-limiting computer implemented method that implements operations of a data node device, in accordance with one or more embodiments described herein.

FIG. 7 is a diagram of an example, non-limiting computer implemented method that implements operations of a data node device, in accordance with one or more embodiments described herein. The blocks of the illustrated method 700 represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

Block 702 depicts performing repetitive accesses of a shared storage location. For example, with reference to FIG. 2, an example NAS server 222(2) at an example data node device 204(2) can perform repetitive accesses 231(3) of partition 212 of shared storage location 210. The repetitive accesses 231(3) can be periodic according to a defined heartbeat period as described herein. In some embodiments, the remaining operations illustrated in FIG. 7, namely operations 704, 706, 708, 710 and 712 can be performed during the repetitive accesses of the shared storage location, that is, operations 704, 706, 708, 710 and 712 can be repeated for each of the accesses performed according to block 702.

Block 704 depicts reading heartbeat information, including access times indicating respective times of access to the shared storage location by the multiple other data node devices. For example, with reference to FIG. 3, a read operation 323 can read example heartbeat information 302, 304, 306, 308, 310, and 312 corresponding to multiple other NAS servers and data node devices. Timestamp 304 comprises an access time indicating a respective recent access time of a data node device, and further timestamps can be stored in further columns 311(1), 311(2), 311(3) . . . 311(M).

Block 706 depicts selecting a cluster controller node device from among data node devices having access to the shared storage location. For example, with reference to FIG. 4, a cluster controller selector 406 can use the heartbeat information read at block 704 to select a node to host the cluster controller. The data node device 204(M), illustrated in FIG. 4, can also be a candidate to host the cluster controller. In an example, the selection can use node priorities such as node priority 306, timestamps such as timestamp 304, and node eligibility flags such as node eligibility flag 310, as described herein, to select the cluster controller node device.

The selection can be a deterministic cluster controller selection process, according to techniques described herein, so that every data node device, when using the same heartbeat information, can select the same data node device to serve as the cluster controller node device. Thus for example, in the event of an access time update delay associated with a previous cluster controller, block 706 can comprise selecting a new cluster controller, e.g., a data node device associated with a highest data node priority, in response to the access time update delay. The new selection can be made by each data node device upon obtaining the access time update delay information, and so data node devices can eventually agree on the new cluster controller node device.

Block 708 depicts updating a cluster controller node device selection by storing, in the shared storage location, information indicating the selected cluster controller node device. For example, with reference to FIG. 3, a write operation 321 can update a cluster controller node device selection by updating current cluster controller node ID 312 to designate the node ID of the data node device selected at block 706.

Block 710 depicts reading multiple other updated cluster controller selections stored in the shared storage location by the multiple other data node devices. For example, with reference to FIG. 3, a read operation 323, optionally a same read operation as used at block 704, can read multiple other updated cluster controller selections stored in the partition 212 of shared storage location 210 by the multiple other data node devices. Absent any failure, the multiple other updated cluster controller selections should confirm the updated cluster controller selection of the data node device performing the read operation 323. Otherwise, in the event of a failure, the multiple other updated cluster controller selections may not match. A cluster controller failover can subsequently be initiated.

Block 712 depicts updating heartbeat information, including an access time indicating a time of access to the shared storage location by the data node device. For example, with reference to FIG. 3, a write operation 321, optionally a same write operation as used at block 708, can update heartbeat information 302, 304, 306, 308, 310, and 312, which includes timestamp 304 indicating a time of access to the partition 212 of the shared storage location 210, e.g., a time at which write operation 321 is performed.

Figure 8:
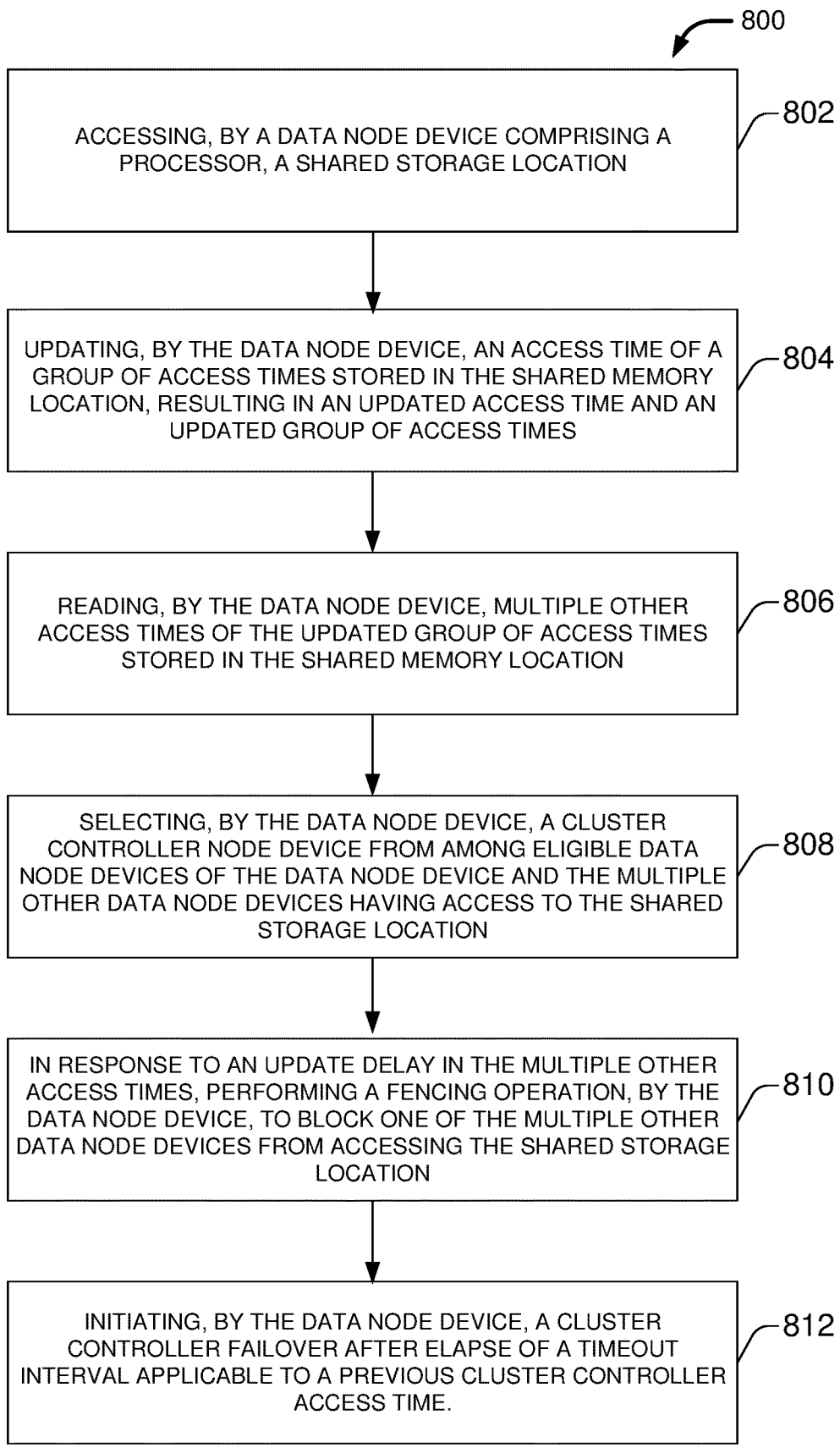
FIG. 8 is a diagram of an example, non-limiting computer implemented method that implements selection of a cluster controller node device, in accordance with one or more embodiments described herein.

FIG. 8 is a diagram of an example, non-limiting computer implemented method that implements selection of a cluster controller node device, in accordance with one or more embodiments described herein. The blocks of the illustrated method 800 represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

Block 802 depicts accessing, by a data node device comprising a processor, a shared storage location. For example, with reference to FIG. 2, an example NAS server 222(2) at an example data node device 204(2) comprising a processor can perform an access 231(3) of partition 212 of shared storage location 210.

Block 804 depicts updating, by the data node device, an access time of a group of access times stored in the shared memory location, resulting in an updated access time and an updated group of access times. For example, with reference to FIG. 2 and FIG. 3, the example NAS server 222(2) at the example data node device 204(2) can update timestamp 304 to indicate a time of access 231(3), resulting in an updated access time and an updated group of access times i.e., timestamps in columns 311(2), 311(3) . . . 311(M).

Block 806 depicts reading, by the data node device, multiple other access times of the updated group of access times stored in the shared memory location. For example, with reference to FIG. 2 and FIG. 3, the example NAS server 222(2) at the example data node device 204(2) can read 323 timestamps such as timestamp 304 in data stored by other data node devices 204(1), 204(3) . . . 204(M), in storage locations represented by columns 311(2), 311(3) . . . 311(M). The multiple other access times indicate times of access by the multiple other data node devices 204(1), 204(3) . . . 204(M) to the partition 212 in shared storage location 210.

Block 808 depicts selecting, by the data node device, a cluster controller node device from among eligible data node devices of the data node device and the multiple other data node devices having access to the shared storage location. For example, with reference to FIG. 2, FIG. 3, and FIG. 4, the example NAS server 222(2) at the example data node device 204(2) can select from among eligible data node devices 204(1), 204(3) . . . 204(M) a data node device to serve as cluster controller node device. The selection can be carried out by a cluster controller selector such as cluster controller selector 406. The eligible data node devices can comprise, e.g., data node devices having updated access times (timestamps) in partition 212, and optionally furthermore having a node eligibility flag 310 set to eligible. The selection can furthermore take into account node priority 306, by selecting an eligible data node device determined to be associated with a highest data node priority, and selection can furthermore account for other factors described herein.

Block 810 depicts, in response to an update delay in the multiple other access times, performing a fencing operation, by the data node device, to block one of the multiple other data node devices from accessing the shared storage location. For example, with reference to FIG. 2, FIG. 3, and FIG. 4, the example NAS server 222(2) at the example data node device 204(2) can observe an update delay comprising an expired timestamp such in a timestamp field in the partition 212. A fence launcher 404 can perform a fencing operation such as described herein to block a data node device of data node devices 204(1), 204(3) . . . 204(M), which data node device is associated with the expired timestamp, from accessing the shared storage location 210.

Block 812 depicts initiating, by the data node device, a cluster controller failover after elapse of a timeout interval applicable to a previous cluster controller access time. For example, with reference to FIG. 2, FIG. 3, and FIG. 4, the example NAS server 222(2) at the example data node device 204(2) can initiate a cluster controller failover by recording a new current cluster controller node ID in the field 312. When data node device 204(2) is itself the selected new cluster controller node device, a cluster controller launcher 408 can launch a cluster controller virtual machine at data node device 204(2) and the cluster controller virtual machine can be enabled with ownership privileges of a root file system for the shared storage location 210. These operations can optionally be delayed for a timeout interval as described herein.

Figure 9:
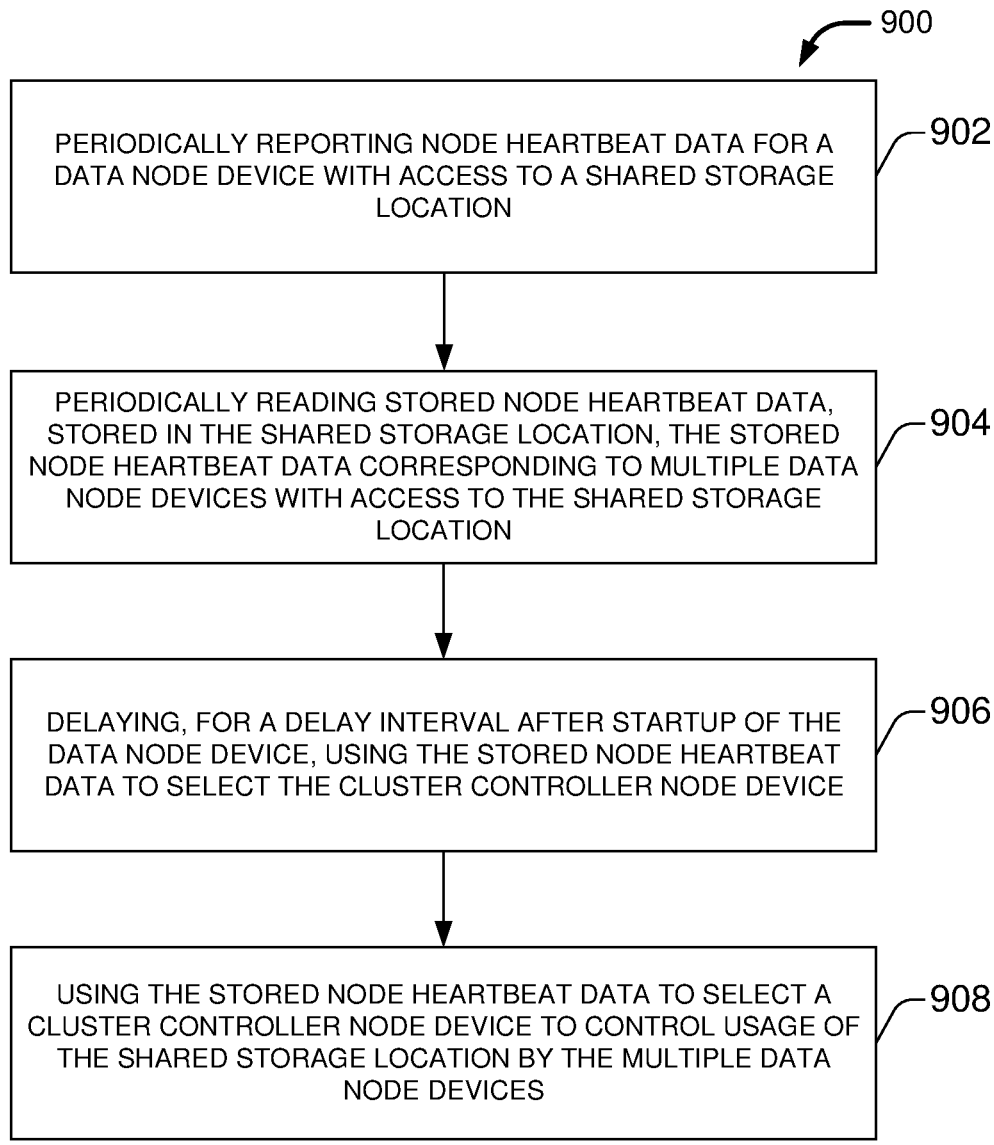
FIG. 9 is a diagram of an example, non-limiting computer implemented method that implements a heartbeat protocol, in accordance with one or more embodiments described herein.

FIG. 9 is a diagram of an example, non-limiting computer implemented method that implements a heartbeat protocol, in accordance with one or more embodiments described herein. The blocks of the illustrated method 900 represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

Block 902 depicts periodically reporting node heartbeat data for a data node device with access to a shared storage location. For example, with reference to FIG. 2 and FIG. 3, the example NAS server 222(2) at the example data node device 204(2) with access to shared storage location 210 can periodically report node heartbeat data 302, 304, 406, 308, 310, and 312 by updating the information stored in partition 212. The node heartbeat data can comprise, inter alia, a data node identifier (node ID 302), a data node heartbeat timestamp (timestamp 304), a data node priority (node priority 306), and a cluster controller selection (current cluster controller node ID 312). The node heartbeat data can further comprise a cluster controller eligibility flag (node eligibility flag 310) to indicate eligibility or non-eligibility of the data node device 204(2) to serve as the cluster controller node device, and a cluster controller flag 308 to indicate whether the data node device 204(2) is the cluster controller node device. The period for periodically reporting node heartbeat data can be any period, and some example periods are discussed herein.

Block 904 depicts periodically reading stored node heartbeat data, stored in the shared storage location, the stored node heartbeat data corresponding to multiple data node devices with access to the shared storage location. For example, with reference to FIG. 2 and FIG. 3, the example NAS server 222(2) at the example data node device 204(2) can periodically read 323 stored node heartbeat data stored in the partition 212 of the shared storage location 210, the stored node heartbeat data corresponding to multiple data node devices 204(1), 204(3) . . . 204(M) with access to the shared storage location 210.

Block 906 depicts delaying, for a delay interval after startup of the data node device, using the stored node heartbeat data to select the cluster controller node device. For example, with reference to FIG. 2, the example NAS server 222(2) at the example data node device 204(2) can delay its own cluster controller node device selection operations for a delay interval after startup of the data node device 204(2), as described herein.

Block 908 depicts using the stored node heartbeat data to select a cluster controller node device to control usage of the shared storage location by the multiple data node devices. For example, with reference to FIG. 2, the example NAS server 222(2) at the example data node device 204(2) can use the stored node heartbeat data in the partition 212 to select a cluster controller node device, e.g., device 204(1), or any other data node device in the storage cluster 200, to control usage of the shared storage location 210 by the multiple data node devices 204(1), 204(2), 204(3) . . . 204(M). The selecting can comprise applying a deterministic process or rule as described herein, e.g., determining a selected data node device with a highest data node priority from among the multiple data node devices. Selection can also be based on any heartbeat timestamp delay determined to be applicable to a previous cluster controller node device, as described herein.

Figure 10:
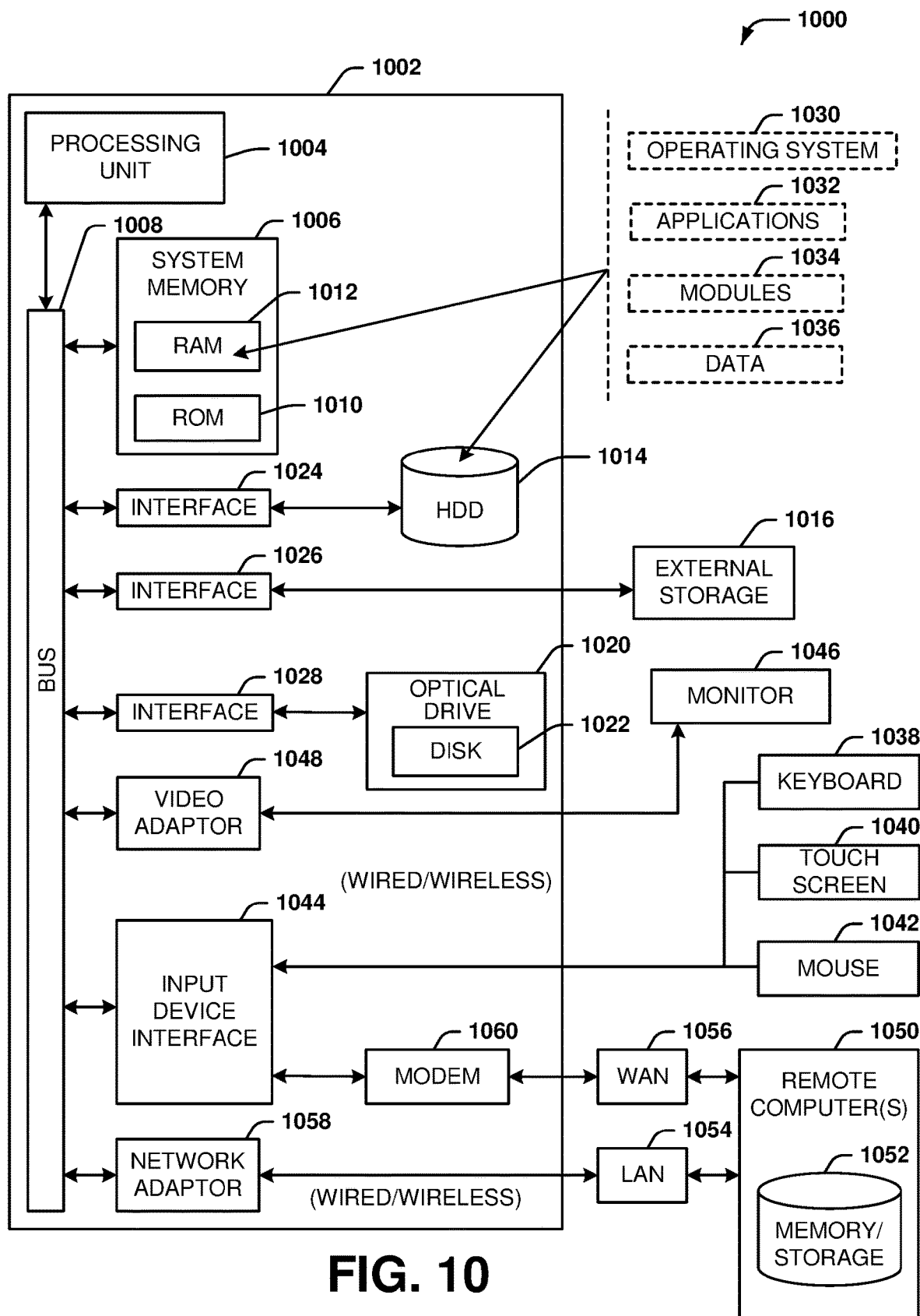
FIG. 10 illustrates a block diagram of an example computer operable to provide a data node device in a storage cluster as described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data node device, comprising:
at least one processor; and
at least one memory that stores executable instructions that, when executed by the at least one processor, facilitate performance of operations, comprising:
performing repetitive accesses of a shared storage location; and
during the repetitive accesses of the shared storage location,
selecting a cluster controller node device from among the data node device and multiple other data node devices having access to the shared storage location, wherein the cluster controller node device administers the shared storage location;
updating a cluster controller node device selection by storing, in the shared storage location, information indicating the cluster controller node device selected by the data node device, the updating resulting in an updated cluster controller node device selection; and
reading multiple other updated cluster controller selections stored in the shared storage location by the multiple other data node devices to confirm the updated cluster controller node device selection of the data node device.

2. The data node device of claim 1, wherein the shared storage location comprises a partition of a logical storage.

3. The data node device of claim 1, wherein the performing the repetitive accesses is periodic.

4. The data node device of claim 1, wherein a period for the performing the repetitive accesses is for about ten seconds or less.

5. The data node device of claim 1, wherein the operations further comprise, during the repetitive accesses of the shared storage location, updating an access time indicating a time of access to the shared storage location by the data node device.

6. The data node device of claim 1, wherein the operations further comprise, during the repetitive accesses of the shared storage location, reading access times indicating respective times of access to the shared storage location by the multiple other data node devices.

7. The data node device of claim 6, wherein the selecting the cluster controller node device from among the data node device and the multiple other data node devices comprises selecting a new cluster controller node device in response to an access time update delay associated with a previous cluster controller node device.

8. The data node device of claim 1, wherein the selecting the cluster controller node device from among the data node device and the multiple other data node devices comprises executing a deterministic cluster controller node device selection process.

9. The data node device of claim 1, wherein the selecting the cluster controller node device from among the data node device and the multiple other data node devices comprises selecting a data node device associated with a highest data node priority.

10. A method, comprising:
accessing, by a data node device comprising a processor, a shared storage location;
updating, by the data node device, an access time of a group of access times stored in the shared memory location, resulting in an updated access time and an updated group of access times, wherein the updated access time indicates a time of access by the data node device to the shared storage location;
reading, by the data node device, multiple other access times of the updated group of access times stored in the shared memory location, the multiple other access times indicating times of access by multiple other data node devices to the shared storage location, the multiple other data node devices being other than the data node device; and
selecting, by the data node device, a cluster controller node device from among eligible data node devices of the data node device and the multiple other data node devices having access to the shared storage location, wherein the eligible data node devices comprise data node devices having updated access times of the updated group of access times.

11. The method of claim 10, further comprising, in response to an update delay in the multiple other access times, performing a fencing operation, by the data node device, to block one of the multiple other data node devices from accessing the shared storage location.

12. The method of claim 10, further comprising initiating, by the data node device, a cluster controller failover after elapse of a timeout interval applicable to a previous cluster controller access time.

13. The method of claim 10, wherein the selecting the cluster controller node device from among the eligible data node devices having access to the shared storage location comprises selecting an eligible data node device determined to be associated with a highest data node priority.

14. The method of claim 10, further comprising, in response to the selecting resulting in selection of the data node device as the cluster controller node device, starting a virtual machine at the data node device and enabling the virtual machine with ownership privileges of a root file system for the shared storage location.

15. A machine-readable storage medium, comprising executable instructions that, when executed by a processor, facilitate performance of operations, comprising:
periodically reporting node heartbeat data for a data node device with access to a shared storage location, the node heartbeat data comprising a data node identifier, a data node heartbeat timestamp, a data node priority, and a cluster controller selection,
wherein the periodically reporting comprises storing the information in the shared storage location;
periodically reading stored node heartbeat data, stored in the shared storage location, the stored node heartbeat data corresponding to multiple data node devices with access to the shared storage location; and using the stored node heartbeat data to select a cluster controller node device to control usage of the shared storage location by the multiple data node devices.

16. The machine-readable storage medium of claim 15, wherein the node heartbeat data further comprises a cluster controller eligibility flag to indicate eligibility or non-eligibility of the data node device to serve as the cluster controller node device, and a cluster controller flag to indicate whether the data node device is the cluster controller node device.

17. The machine-readable storage medium of claim 15, wherein the using the stored node heartbeat data to select the cluster controller node device comprises determining a selected data node device with a highest data node priority from among the multiple data node devices.

18. The machine-readable storage medium of claim 17, wherein the selecting the data node device comprises applying a deterministic rule.

19. The machine-readable storage medium of claim 15, wherein the operations further comprise delaying, for a delay interval after startup of the data node device, the using the stored node heartbeat data to select the cluster controller node device.

20. The machine-readable storage medium of claim 15, wherein the using the stored node heartbeat data to select the cluster controller node device comprises selecting a new cluster controller node device based on a heartbeat timestamp delay determined to be applicable to a previous cluster controller node device.

* * * * *